(12) United States Patent
Raphaeli et al.

(10) Patent No.: US 11,469,935 B2
(45) Date of Patent: **\*Oct. 11, 2022**

(54) REDUCTION OF PEAK TO AVERAGE POWER RATIO

(71) Applicant: RAMOT AT TEL AVIV UNIVERSITY LTD., Tel Aviv (IL)

(72) Inventors: Dani Raphaeli, Kfar Saba (IL); Or Levi, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,295

(22) Filed: Mar. 7, 2021

(65) Prior Publication Data
US 2021/0306193 A1    Sep. 30, 2021

Related U.S. Application Data

(63) Continuation-in-part of application No. 16/706,838, filed on Dec. 9, 2019, now Pat. No. 10,944,605.

(60) Provisional application No. 62/777,174, filed on Dec. 9, 2018.

(51) Int. Cl.
*H04L 27/26* (2006.01)
*H04L 5/00* (2006.01)

(52) U.S. Cl.
CPC ........ *H04L 27/2618* (2013.01); *H04L 5/0007* (2013.01); *H04L 27/2689* (2013.01)

(58) Field of Classification Search
CPC ... H04L 1/006; H04L 25/4975; H04L 1/0026; H04L 27/2626; H04L 27/2615; H04L 27/3411; H04L 27/2647; H04L 27/366; H04L 27/3809; H04L 27/2601; H04L 27/2614; H04L 1/0016; H04L 27/2684; H04L 5/0007; H04L 27/2689; H04L 27/2618; H04B 10/40; H03M 13/256; H03M 13/258; H03M 5/20

See application file for complete search history.

(56) References Cited

U.S. PATENT DOCUMENTS

| | | | |
|---|---|---|---|
| 10,944,605 B2 * | 3/2021 | Raphaeli | H04L 27/3809 |
| 2007/0124656 A1 * | 5/2007 | Pisek | H03M 13/2957 |
| | | | 714/794 |
| 2012/0076233 A1 * | 3/2012 | Lim | H04L 27/2614 |
| | | | 375/295 |
| 2012/0177148 A1 * | 7/2012 | Flamant | H04L 27/2624 |
| | | | 375/316 |
| 2016/0173310 A1 * | 6/2016 | Nayar | H04W 72/044 |
| | | | 370/330 |

* cited by examiner

*Primary Examiner* — Rahel Guarino
(74) *Attorney, Agent, or Firm* — Browdy and Neimark, P.L.L.C.

(57) ABSTRACT

A method for Peak to Average Power Ratio (PAPR) reduction at an input of analog to digital converter (ADC) of the receiver, the method includes mapping, by a mapper, an input symbol to an output symbol that maintains a peak power constraint at the input of the ADC; wherein the mapping is responsive to (a) previously transmitted symbols and (b) a state of the channel following a transmission of the current output symbol; transmitting the output symbol by the transmitter; receiving, by the receiver, a received symbol that represents the output symbol; and de-mapping the received symbol, by a de-mapper of the receiver, to a de-mapped symbol that represents the input symbol.

22 Claims, 8 Drawing Sheets

```
┌─────────────────────────────────────────────────┐
│ Mapping, by a mapper, an input symbol to an     │
│ output symbol that maintains a peak power       │
│ constraint at the input of the ADC of the       │
│ receiver. The wherein the mapping is responsive │
│ to previously transmitted symbols. 410          │
└─────────────────────────────────────────────────┘
                        │
                        ▼
┌─────────────────────────────────────────────────┐
│ Selecting as the output symbol a selected       │
│ candidate symbol out of a set of candidates     │
│ symbols that when transmitted the peak power    │
│ constraint at the ADC input is satisfied, when  │
│ determining whether a transmission of an output │
│ symbol that equals the input symbol will cause  │
│ to a deviation from the peak power constraint   │
│ at the input of the ADC. 412                    │
└─────────────────────────────────────────────────┘

Mapping, by a mapper, an input symbol to an output symbol that maintains a peak power constraint at the input of the ADC of the receiver. The wherein the mapping is responsive to previously transmitted symbols and to a state of the channel following the transmission of the output symbol. 411

Selecting as the output symbol a selected candidate symbol out of a set of candidates symbols that when transmitted the peak power constraint at the ADC input is satisfied, when determining whether a transmission of an output symbol that equals the input symbol will cause to a deviation from the peak power constraint at the input of the ADC. 412

REDUCTION OF PEAK TO AVERAGE POWER RATIO

CROSS-REFERENCE

This application is a continuation in part of U.S. patent application Ser. No. 16/706,838 filing date Dec. 9, 2019 to be granted on Mar. 9, 2021, which claims priority from U.S. provisional Ser. No. 62/777,174 filing date Dec. 9, 2018—both are incorporated herein by reference.

BACKGROUND

Wireline communication channels such as, chip-to-chip SerDes communication channels, optical communication channels, and magnetic recording channels, can be modeled by additive white gaussian noise (AWGN) channels with intersymbol interference (ISI)

Recently, advanced very high speed links are starting to employ ADCs at the receiver to convert the analog signal to a digital signal. An important parameter of an ADC device is the Signal to Noise and Distortion Ratio (SNDR) or equivalently effective number of bits (ENOB).

To avoid excessive signal distortion due to clipping, the ADC is required to have a large dynamic range to achieve the desired system performance. The demand of a large dynamic range translates to higher circuit design complexity and higher power consumption.

Signals at the ADC input are therefore backed-off (BO) with respect to the ADC saturation point.

For an ADC with a given input signal range and ENOB, the input signal power BO improves the signal to clipping distortion ratio but degrades the receiver signal to quantization noise ratio (RSQNR), as well as signal to thermal noise ratio of the ADC output, as the noise power due to quantization noise and thermal noise are independent in the input signal power. Thus, decreasing the signal to clipping distortion while keeping on both signal to quantization noise and signal to thermal noise ratios is a desired approach, which can be performed by decreasing the PAPR of the signal at the ADC input.

The ever increasing demand for higher data rates in wireline communication channels is not going to stop in the foreseen future. Raw data rates of 100 Gbps, 200 Gbps and 400 Gbps are intended to be used in the next Ethernet generation.

However, the PAPR is increased especially as the symbol rate gets higher on the same physical channel. For example, a comparison between the PAPR distributions at the ADC input, in different transmission rates, is shown in FIG. 1.

In this example, the transmission is over a SerDes channel (typical 50 cm chip to chip trace), and the transmitted symbols are chosen uniformly from 8-PAM constellation. It can be seen that the PAPR in these cases, depending on the transmission rate, may reach well over 10 dB.

The mainly reason of high PAPR is due to ISI at the receiver, which causes by the channel impulse response. Thus, several approaches for eliminating the ISI can be used for PAPR reduction at the receiver. One approach is Zero-Forcing (ZF) equalizer, which is a filter with spectral response inverse of the channel response, can be used on the analog signal, prior the ADC, in order to completely remove ISI and reduce the PAPR. However, the circuit design complexity of such an analog equalizer is high. Moreover, the equalizer generates high noise enhancement in frequencies where the channel response has high attenuation.

A possible solution to overcome the noise enhancement is by using the ZF filter in the transmitter. However, in this case the PAPR at the transmitter will be high. To avoid saturation of the transmitted signal by the power amplifier, the transmitted signal at the power amplifier input is backed-off (BO), so that instantaneous high peak values will not result in saturation. The cost of the BO is that the average power of the signal is lower, thus compromising the error performance.

Another equalizer that can be used for ISI (or PAPR) reduction at the ADC input is a continues time linear equalizer (CTLE). The CTLE is an analog high pass filter, approximating the ZF, constructed from analog components, both passive (resistors, capacitors, inductors) and active (amplifier), used prior to ADC, that boost up high-frequencies to counter the channel attenuation and distortion.

Consequently, the impulse response of the equivalent channel, resulting from concatenating the channel and the CTLE filter impulse responses, spans over much lower symbol periods compared to the channel impulse response. Hence, both ISI and PAPR are lower at the ADC input.

There are two main disadvantages with passive CTLE. First, the RC network introduces large impedance discontinuity at the channel and equalizer interface. Impedance matching networks, often employing inductors, can be used to prevent the discontinuity. However, the large inductors make this approach less suitable for on-chip integration. Second, this method cannot improve SNR, since equalization is performed by attenuating low-frequency signal spectrum.

It is desirable therefore to have a gain greater than one at all frequencies to maximize the benefit from receiver-side equalization. Hence, CTLE using active circuit elements rather than passive components are required. However, active CTLE amplifies the high frequency noise which potentially degrading the noise margin.

There is a growing need to provide an efficient system, method and a computer readable medium for maintaining a desired PAPR constrains an input of an ADC of a receiver.

BRIEF DESCRIPTION OF THE DRAWINGS

The embodiments of the disclosure will be understood and appreciated more fully from the following detailed description, taken in conjunction with the drawings in which:

FIG. 4 is an example of a method;
FIG. 8 is an example of a method.

DETAILED DESCRIPTION OF THE DRAWINGS

Figure 1:
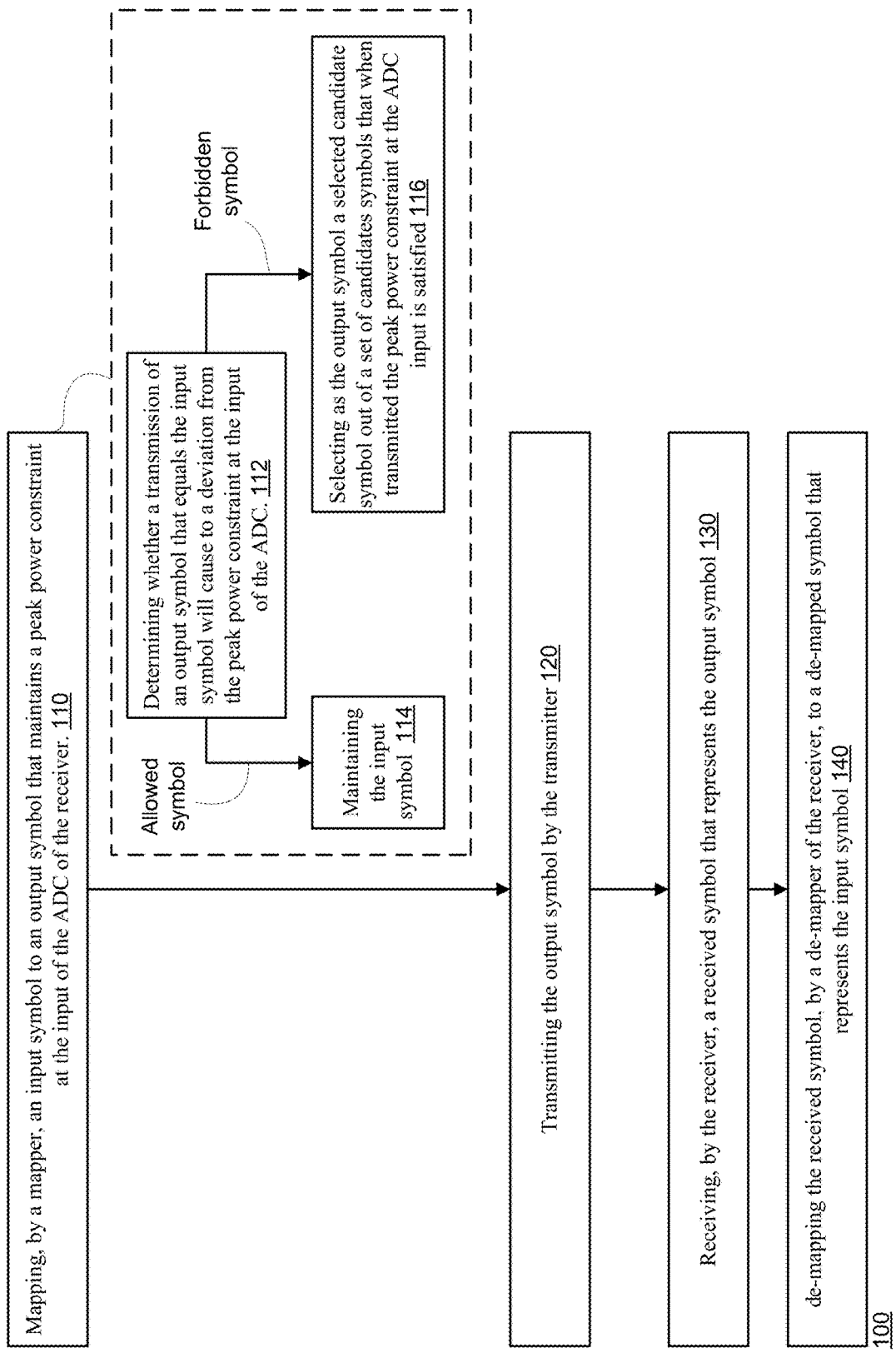
FIG. 1 is an example of a method.

Any reference to a device should be applied, mutatis mutandis to a method that is executed by a device.

Any reference to method should be applied, mutatis mutandis to a device that is configured to execute the method.

The term "and/or" is additionally or alternatively.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the device.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

There may be provided a method for Peak to Average Power Ratio (PAPR) reduction at an input of analog to digital converter (ADC) of the receiver.

FIG. 1 is an example of method 100.

Method 100 may start by step 110 of mapping, by a mapper, an input symbol to an output symbol that maintains a peak power constraint at the input of the ADC of the receiver.

The mapping may be responsive to previously transmitted symbols.

The mapping may be set regardless of a maximization of entropy.

The mapping may be responsive to a channel impulse response and to a maximal power allowed by the input of the ADC. The ADC is a part of the receiver that converts analog signals from a channel to digital signals that then may digitally processed.

Figure 5:
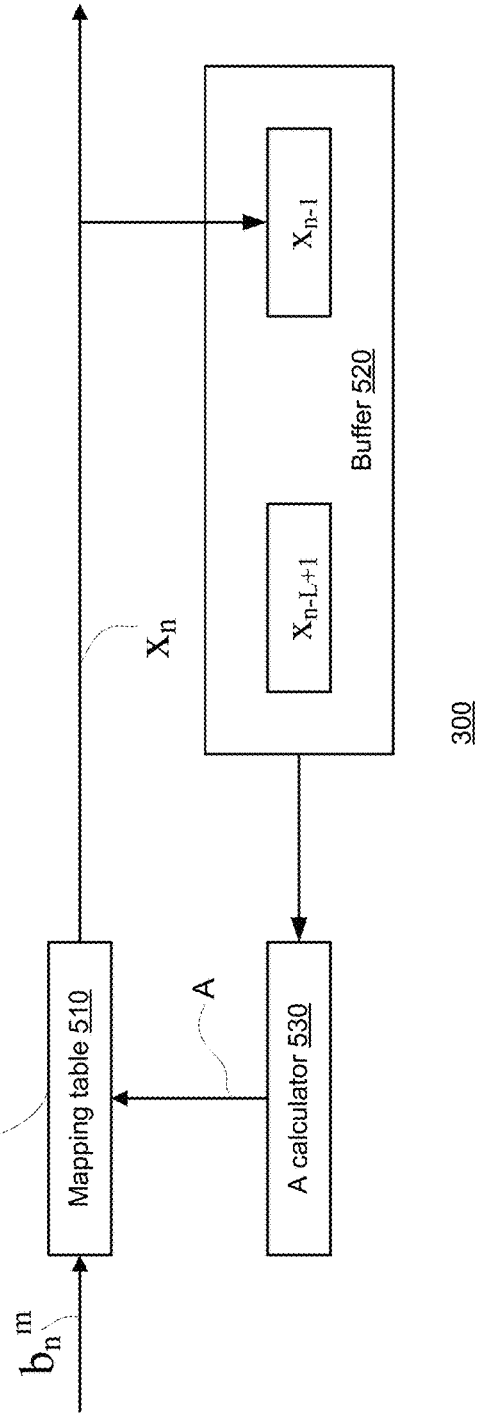
FIG. 5 is an example of a precoder.

The mapping of an input symbol to an output symbol $x_n$ depends on the channel impulse response and the peak power constraint according to the precoder of FIG. 5.

Step 110 may include step 112, 114 and 116.

Step 112 may include determining whether a transmission of an output symbol that equals the input symbol will cause to a deviation from the peak power constraint at the input of the ADC. In other words—step 112 may determine of a certain (for example—the n'th output signal) is forbidden or not.

The determination may be based on various parameters such as the channel state, the channel impulse response and probability $P_{peak}$. These parameters may be known, estimated, or evaluated over time.

The peak power constraint me be (or may be determined based on) probability $P_{peak}$. Denoting $P_n$ as the instantaneous power of a signal at an input of an ADC then a peak $P_r$ is defined as a value of $P_n$ which exceeded with the probability $P_{peak}$.

PAPR stands for a peak to average power ratio. A PAPR gain ($G_{PAPR}$) is the ratio between a PAPR of a system that implements method 100 to a PAPR of a system that does not implement method 100.

RSQNR stands for a receiver signal to quantization noise ratio. The RSQNR reflects the relationship between the average power of the received signal and the quantization noise introduced by the ADC.

A RSQNR gain ($G_{PSQNR}$) is the reduction in a required power at the receiver for a given symbol rate—the reduction is measured in relation to a system that does not implement method 100.

The overall shaping gain $G_T$ may equal the sum (when represented in dB) of $G_{PAPR}$ and $G_{PSQNR}$.

The probability $P_{peak}$ may determine the overall shaping gain $G_T$.

If the output signal is not forbidden—then step 112 may be followed by step 114 of maintaining the input symbol—determining that the output symbol may equal the input signal.

If the output signal is forbidden—then step 112 may be followed by step 116 of mapping the input symbol to an output symbol that differs from the output symbol—to an output symbol that is not forbidden.

Step 116 may include selecting as the output symbol a selected candidate symbol out of a set of candidates symbols that when transmitted the peak power constraint at the ADC input is satisfied.

Step 116 may perform the selecting in various manners—for example—by selecting a selected output symbol of the set that has a lowest Hamming distance from the input symbol, out of the set of candidates symbols. The output symbol should belong to set $\bar{F}$. If set $\bar{F}$ contains many candidates then, the symbol with the lowest hamming distance is chosen.

Step 116 may include using a channel-state dependent mapping table comprising, for each current channel state, quantized values of probabilities of a next channel state to become sk, given that the current state is sk-1.

Method 100 may include calculating the set of candidate symbols.

Step 105 may be preceded by performing error correction coding (ECC) to provide codewords that are then undergo step 110. The ECC may apply an iteratively decodable code that may handle erasures. (here we can explain that the operation of the precoder is similar to puncturing though a dynamic one, and each bit punctured is handled by the receiver as an erasure). An example is a turbo code. The codeword may be divided into m-tuples $b^m$. At time instance n the mapping may include mapping each $b^m_n$ into a symbol $x_n$.

LLR values computed by the BCJR may be used as a priori input to the ECC encoding.

In each iteration, the decoder produces extrinsic LLR values $(\Lambda^e)^{mN}$ which are used as an a priory input to the BCJR module, which in turn calculates new extrinsic LLRs which are sent back to the code decoder. After a predetermined number of iterations has been reached, the bit estimations $\hat{u}$ are determined by performing hard decision on the decoder LLR values $(\Lambda^e)^{Mn}$. Initially, all $(\Lambda^e)^{mN}$ may be set to zero. The decoding complexity may be reduced by saturating the BCJR extrinsic LLRs.

Step 110 may be followed by step 120 of transmitting the output symbol by the transmitter.

Steps 110 and 120 may be executed by the transmitter.

The mapping may include imposing a Markovian symbol distribution at an output of the transmitter. The Markovian symbol distribution may be optimal or non-optimal.

For example, the Markovian symbol distribution may be determined to be optimal for given values of RPQNR and Transmitter Signal to Thermal Noise Ratio (TSTNR).

This may include a first step of finding a maximal entropy Markovian distributions under peak constraints, and a second step of finding the Markovian distribution with the highest MI, among the Markovian distributions calculated in the first step.

The first step may include optimizing the MI with respect to probability $P_{peak}$ while keeping TSTNR and PRQNR constant. This step may be implicit in the online precoder. The online precoder provides an approximation to the optimal distribution.

Step 120 may be followed by step 130 of receiving, by the receiver, a received symbol that represents the output symbol. The received symbol may be altered by the channel.

Step 130 may be followed by step 140 of de-mapping the received symbol, by a de-mapper of the receiver, to a de-mapped symbol that represents the input symbol.

Step 140 may include reversing the mapping of step 110.

Step 140 may include applying a reduced complexity BJCR process on the received symbols, wherein the branches probabilities of each state in the trellis are calculated on the fly.

Figure 2:
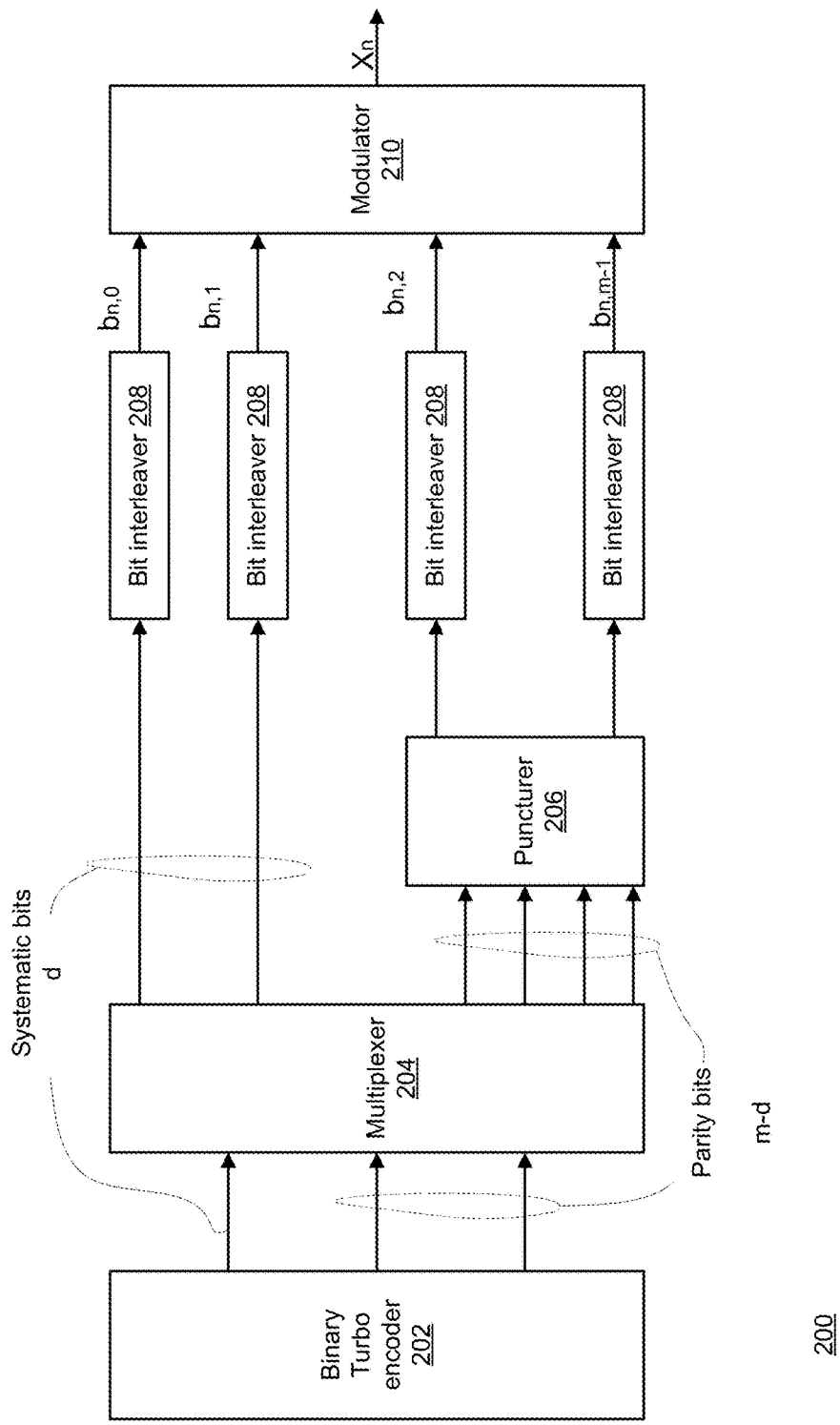
FIG. 2 is an example of a turbo encoder.

FIG. 2 illustrates an example of a turbo encoder 200 that is configured to implement method 100.

The turbo encoder may include binary turbo encoder 202, multiplexer 204, puncturer 206, bit interleaves 208 and modulator 210.

A binary information stream u is firstly encoded (by binary turbo encoder 202) with a rate d/m systematic error correction code (ECC code) into a code word.

The code word is then divided into m-tuples, with $m=\log_2(M)$, where in each tuple the first d bits are information bits (denoted "systematic bits") and the last m-d bits are parity bits.

Then, at time instance n, the modulator 210 maps (step 110) each m-tuple (of $b_{n,0}$ till $b_{n,m-1}$) into a symbol from Xn, using a mapping function.

According to the channel state at time n, the channel impulse response, and $p_{peak}$, the mapping function calculates a mapping table of size $2^m$ by using a bit labeling algorithm. Then, the mapping table is used to map the m tuple to a symbol Xn.

Due to the astronomical number of states at high symbols rate, the maximal entropy Markovian distribution in may be hard to calculate.

Thus, in the practical scheme described above, the distribution may be actually calculated by the mapping function. The calculated distribution is designed to keep the peak constraint, $p_{peak}$, at the ADC input, but not to maximize the entropy. Thus, the implementation may be sub-optimal and may result in an insignificant loss compared to optimal solution.

An example of the bit labeling calculation (and thus the symbol distribution), given a channel impulse response, a channel state, and $p_{peak}$, which performs by the mapping function, is describe in the following section. Note, the same mapping function is used in both transmitter and receiver.

The goal of the mapping function is to calculate the mapping table at step n, given channel state, channel impulse response, and $p_{peak}$. This calculation can be divided to two steps. Firstly, the forbidden symbols at step n (symbols that will result $p_n > p_{peak}$) can easily be found since that the channel state, the channel impulse response, and $p_{peak}$ are known.

The goal of the bit labeling process is to map all the possible $2^m$ bit combinations at the modulator input, to a constellation symbol. If the set of non-forbidden symbols is empty then the mapping is the Gray mapping. Since that not always all the constellation symbols are allowed to be transmitted (set of non-forbidden symbols is not empty), all the Gray bit labels of the symbols in the set of non-forbidden symbols are actually free and should be assign to the symbols in the set of forbidden symbols. The assignment is according to the minimum hamming distance criterion, i.e., each free label should be assigned to a symbol in F, such that there are minimal different bits between the original Gray bit label of the symbol and the free label. The different bits among the labels are actually erased and should be decoded right by the receiver suggested in FIG. 3.

An example of a mapping table of 4-PAM constellation, is presented in table I.

In this example, symbol x=−1 is transmitted with probability 1/2, and symbols x=1 and x=3 are transmitted with probability 1/4 each. Note that in this case, symbol x=−3 is transmitted with zero probability and thus, 2 labels assigned to symbol x=−1. Therefore, the upper bit is actually erased (denoted by X). Note, in the case where all the constellation symbols can be transmitted, the mapping table is simply the Gray labeling of the constellation.

TABLE I

| Address | b0 | b1 | Symbol Point | Pr | Label |
|---|---|---|---|---|---|
| 0 | 0 | 0 | −1 | ½ | X0 |
| 2 | 1 | 0 | | | |
| 1 | 0 | 1 | 1 | ¼ | 01 |
| 3 | 1 | 1 | 3 | ¼ | 11 |

The receiver 300 includes a maximum a posterior probability (MAP) equalizer 302, de-interleaver 304, demultiplexer 306, binary turbo decoder 308 and puncturer and bit interleaver 310. The MAP equalizer receives the output of the ADC.

FIG. 5 illustrates an example of a precoder 500. The precoder 500 include mapping table 510, buffer 520 and A calculator.

Element $b_n^m$ is fed to mapping table 510 of size $2^Q \times Q$ (Q is the constellation size) that outputs $x_n$ that is an output signal of the precoder 500. In addition, $x_n$ is fed to a buffer 520 that stores L previous values $x_{n-1}$ till $x_{n-L+1}$ that are fed to calculator 530 that calculates A.

FIG. 5 also illustrates an example of a mapping table for a 4-PAM constellations. Other tables may be used for other constellations and even for the 4-PAM constellation. At the table—col index—index of an input symbol, row index-decimal representation of A and value-output symbol FIG. 5 also illustrates an example of a calculation of A. Ai has zero of one value based on whether xi belongs to F or not.

F is calculated by an equation also illustrate din FIG. 5. In this equation X is a set of all constellation symbols, γ is a peak power constraint, and h0 . . . hL−1 are—channel impulse responses.

Figure 6:
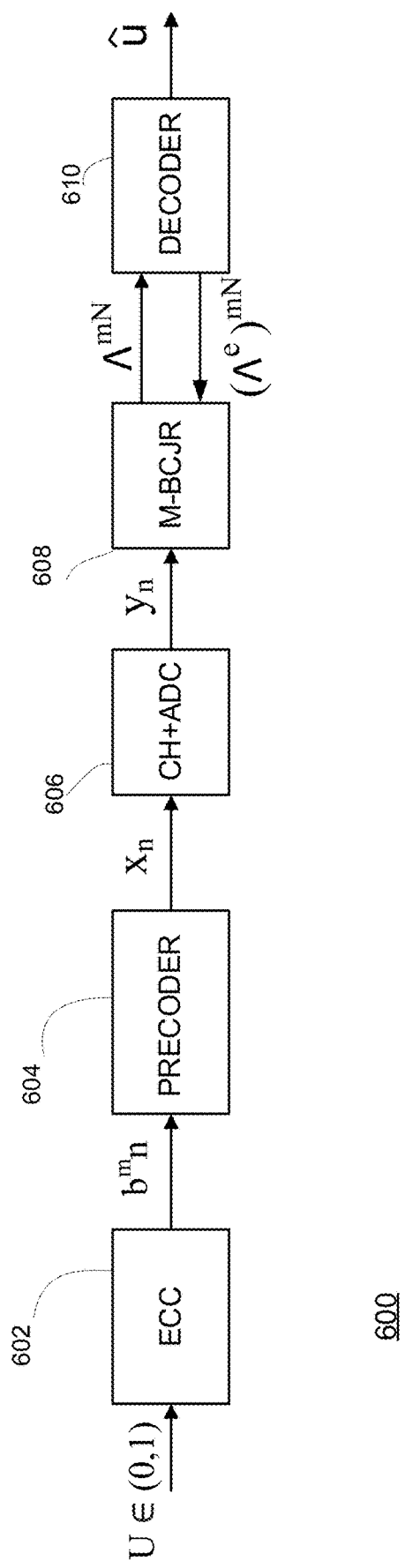
FIG. 6 is an example of a system.

FIG. 6 illustrates a system 600 that includes a receiver and a transmitter. The transmitter includes error correction encoder (ECC) 602 followed by a precoder 604. The precoder 604 is followed by a channel (wired or wireless) that is followed by an ADC (or an analog front end of the receiver followed by the ADC)—in FIG. 600 the channel and ADC are collectively denoted CH+ADC 606.

The ADC is followed by M-BCJR module 608 and a decoder 610. The decoder outputs a reconstruction of input signals.

The precoder 604 of FIG. 5 is configured to recover erased bits during the BCJR and decoder operation.

Figure 7:
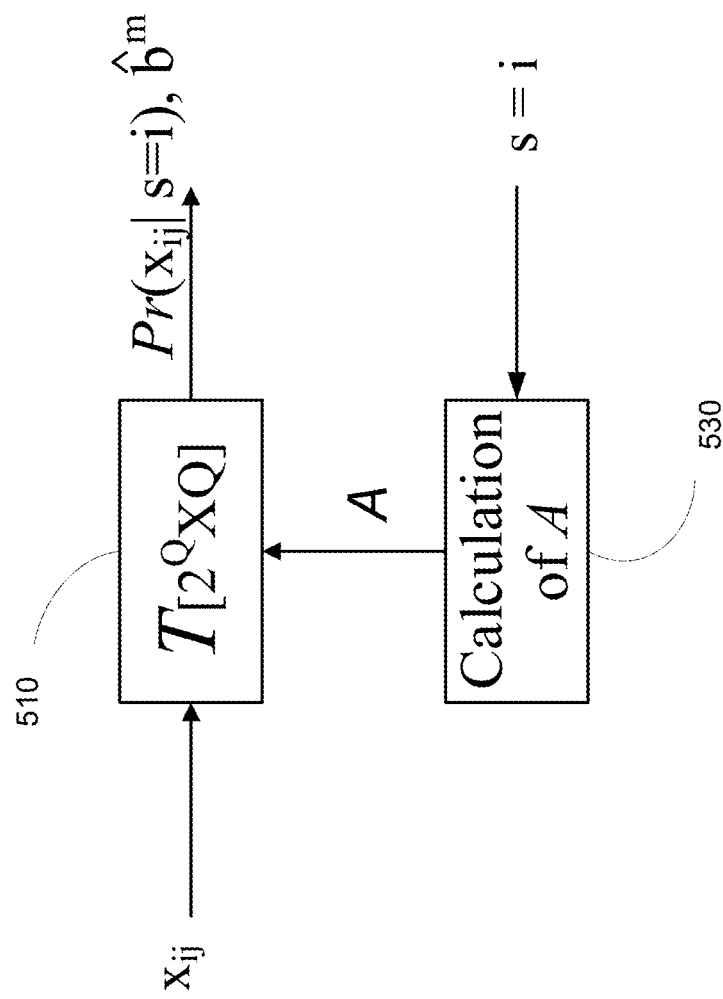
FIG. 7 is an example of a part of the precoder.

FIG. 7 is an example of a process of calculating online the branch probability in the BCJR Trellis. The calculation involves mapping table and A calculator.

Figure 3:
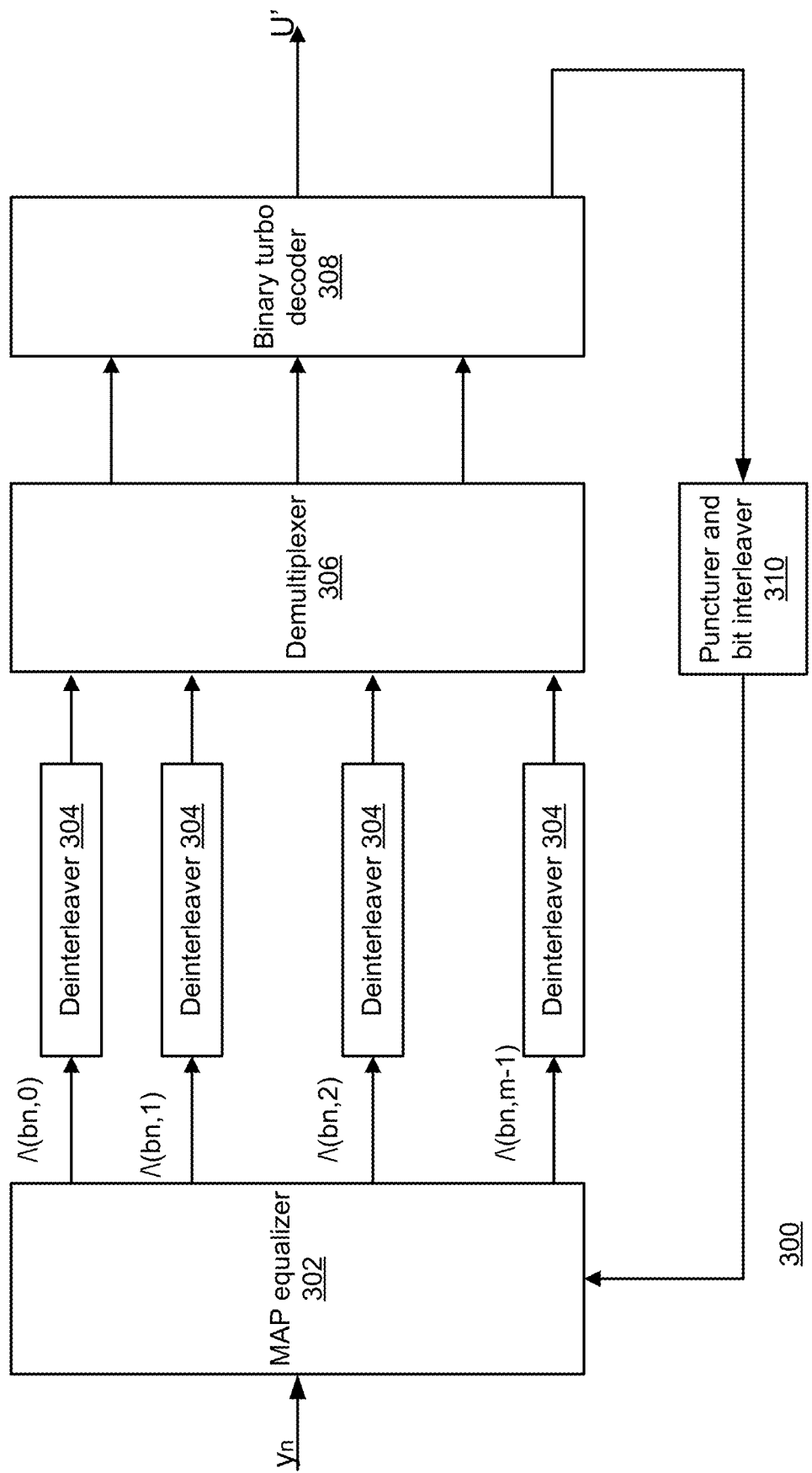
FIG. 3 is an example of a receiver.

At the receiver side, shown in FIG. 3, the noisy symbol $y_n$ is received by MAP equalizer 302. The MAP equalizer may be based on a M-BCJR algorithm, which keeps, at every step, T states with highest metric. The LLR values $\Lambda^I(b_j)$, where $0 \le I \le m-1$, are produced for each encoded bit. The LLR values are used, after appropriate bit de-interleaving (by de-interleaver 304), as a priory input to a binary turbo decoder 308. In each iteration, the binary turbo decoder 308 produces extrinsic LLRs which fed via puncturer and bit interleaver 310 to MAP equalizer and are used as an a priory input of the calculation of new extrinsic LLRs which are sent back to the binary turbo decoder. After a pre-determined number of iterations has been reached, the bit estimations are determined by performing hard decision on the turbo decoder's a posteriori LLRs.

The extrinsic LLRs $\Lambda^1(b_l)$, for each $y_n$, may be calculated using M-BCJR algorithm applied on the channel states Trellis diagram. For each $y_n$, the BCJR is producing m LLR values. Since the bit labeling of $y_n$ depends on the channel state (i.e., the bit labeling of $y_n$ can be different for each channel state) then, to produce LLR values, the bit label of each survivor state is calculated by using the same mapping function used at the transmitter. (see—FIG. 3)

Once the block of noisy symbols $y=(y_0, \ldots, y_{N-1})$ has been received, the M-BCJR algorithm is running, and computes $\sigma_{ijn}=\Pr(s_{n-1}=i;\ s_n=j;\ y)=\Pr(s_{n-1}=i;\ c_{ij};\ y)$ for all $0 \leq n \leq N-1$, and for T states with the highest metrics at step $n-1$. The symbol that results to a transition from state i to state j, denoted by $c_{ij}$.

Next, the BCJR extrinsic LLRs, for each $y_n$, can be calculated by $$\Lambda_n'(b_l) = \log\left(\sum_{(i,j)\in E_0} \frac{\sum_{c_{i,j}:b_i=0} \sigma_{ij_n} + \sum_{c_{ij}:b_1=X} \sigma_{ij_n} \cdot P_0}{\sum_{c_{i,j}:b_i=1} \sigma_{ij_n} + \sum_{c_{ij}:b_1=X} \sigma_{ij_n} \cdot P_1}\right) - \Lambda_n^e(b_l)$$

Where $\Lambda^e(b_l)$ is the extrinsic LLR from the Turbo decoder, $P_0=\Pr(b_l=0)$, and $P_1=\Pr(b_l=1)$. Initially, all $\zeta^e(b_l)$ are set to 0. The bit probabilities, $\Pr(b_l=0)$ and $\Pr(b_l=1)$, are calculated from $\Lambda^e(b_l)$. Note, the BCJR module calculates the bit labeling of each $c_{ij}$ by the mapping function used at transmitter (FIG. 3)

The decoding complexity can be reduced by manipulating the BCJR extrinsic LLRs, calculated above, according to $$\Lambda_n(b_l) = \log\left(\frac{\max(P_n(b_l = 0), K_n(b_l))}{\max(P_n(b_l = 1), K_n(b_l))}\right)$$

For each bit the threshold value $Kn(b_l)$ is computer as:

$$K_n(b_l) = \gamma \max_{b_l \in [0,1]} (P_n(b_l))$$

The bit probabilities $P_n(b_l=0)$ and $P_n(b_l=1)$ are calculated using the first equation for BCJR extrinsic LLRs, for each $y_n$, and the value of $\gamma$ is optimized to yield the best BER performance.

FIG. 4 illustrates method 400 for Peak to Average Power Ratio (PAPR) reduction at an input of analog to digital converter (ADC) of the receiver.

Method 400 may start by step 410 of mapping, by a mapper, an input symbol to an output symbol that maintains a peak power constraint at the input of the ADC; wherein the mapping is responsive to previously transmitted symbols.

Step 410 may include selecting (412) as the output symbol a selected candidate symbol out of a set of candidates symbols that when transmitted the peak power constraint at the ADC input is satisfied, when determining whether a transmission of an output symbol that equals the input symbol will cause to a deviation from the peak power constraint at the input of the ADC.

Step 410 may be the same as step 110 or may differ from step 110.

According to an embodiment of the disclosure there may be provided a step of mapping, by a mapper, of an input symbol (referred to as a current input symbol) to an output symbol (referred to as a current output symbol) that maintains a peak power constraint at the input of the ADC. The mapping is responsive to (a) previously transmitted symbols, and also to (b) state of the channel following a transmission of the current output symbol.

The state of the channel changes after the transmission of each output symbol—and the mapping may take into account next output symbols to be transmitted after the current output symbol.

For example—the mapping may check whether the state of the channel will allow to transmit the one or more next symbols—and may prevent a transmission of a current output symbol that prevent a transmission of any output symbol during one or more points of time that follow the transmission of the current output symbol.

The one or more next output symbols may be within a time window that follows the transmission of the current output symbol. The time window may be limited to include only the next output symbol. The time window may or may not exceed the delay of the channel. The delay D of the channel is the gap between the first tap of the channel impulse response and the tap of maximal intensity of the channel impulse response. In other words—the delay is the number of taps that takes to the channel impulse response, $h^L$, to reach its maximal value.

This embodiment may be included in method 100. For example—executing step 110 for mapping, by a mapper, an input symbol to an output symbol that maintains a peak power constraint at the input of the ADC of the receiver—whereas the mapping is responsive to (a) previously transmitted symbols, and also to (b) next symbols to be transmitted after the current output symbol.

FIG. 8 illustrates method 401 that include step 411 and step 412.

Step 411 replaces step 410 of FIG. 400 and includes mapping, by a mapper, an input symbol to an output symbol that maintains a peak power constraint at the input of the ADC of the receiver. The mapping is responsive to previously transmitted symbols and to candidates for next transmitted symbols. Especially—the mapping is responsive to the current state of the channel (based at least in part on the previously transmitted symbols)—and to the state of the channel within a time window that follows the transmission of the current output symbol.

Accordingly—in order to ensure that at least one output symbol is allowed for transmission in every time step the mapping may be as follows.

In every time step n, the precoder maps m=log 2(M) coded bits to an output symbol $x_n$ that satisfies first peak power constraint $p_n \leq \gamma$. To do so, the precoder firstly calculates the allowed symbols for transmission at step n according to the channel state $s^{L-1}$, where $s^{L-1}$ is defined by the last L−1 transmitted symbols.

A second constraint is added and refers to the state of the channel after the transmission of the current output symbol—within a time window.

The second constraint should prevent a situation in which a transmission of an output symbol that satisfies $p_n \leq \gamma$ would cause that none of the constellation symbols are allowed for transmission in the next time window. The time window may or may not exceed D.

In order to ensure that in the next D channel states (or within a time window that exceed D or may equal D) at least one allowed symbol exists, an allowed output symbol in the current time step n should fulfill the following conditions: (a) it does not cause peak deviation in the current time step (i.e., $p_n \leq \gamma$) and (b) at least one symbol is allowed for transmission (i.e., does not cause peak deviation) in the next D channel states.

Thus—if during the time window there is at least one time in which no output symbol can be transmitted (due to the state of the channel at that time)—there is a need to find another output symbol that will allow the transmission of one all combinations of output symbols can be transmitted at that time.

Example of the Algorithm for D=1 is shown below. Higher D values require to evaluate combinations of multiple output symbols during multiple times.

```
Input: channel state s^{L-1}, channel impulse response h^L, peak constraint γ,
constellation X
Output: A^M (M is constellation cardinality)
Init: A[1 X M] = (false, false, ... , false)
    Algorithm for D = 1 :
    For i = 1: M do
        p = |X[i] · h[1] + Σ_{k=2}^L s[k − 1] · h[k]|^2
        If p ≤ γ then
            s[1] ← X[i]
            s[2: L − 1] ← s[1: L − 2]
        else
            continue
        End if
        For j = 1: M do
            p = |X[j] · h[1] + Σ_{k=2}^L s[k − 1] · h[k]|^2
            If p ≤ γ then
                A[i] ←true
                break
            End if
        End for
    End for
```

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any device that is illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

The invention claimed is:

1. A method for communication by symbols, the method comprising:
   mapping, by a mapper, an input symbol to an output symbol such that reception of the output symbol by a receiver maintains a peak power constraint at an input of the receiver; wherein the mapping is responsive to a state of a communication channel to said receiver following a transmission of said output symbol;
   transmitting the output symbol by a transmitter over the communication channel;
   thereby enabling to reduce a Peak to Average Power Ratio (PAPR) at the input of the receiver.

2. The method according to claim 1, wherein said output symbol having a certain value, and wherein the mapping comprises determining whether transmission of said output symbol having said certain value will affect a deviation from the peak power constraint at the input of the receiver upon transmission of an additional output symbol of any value over the communication channel during a time window that follows said transmitting of the output symbol.

3. The method according to claim 2, wherein the mapping comprises setting said output symbol with a value that differs from said certain value upon determining that said state of the communication channel following said transmitting of the output symbol of the certain value will affect said deviation upon the transmission of the additional output symbol of any value over the communication channel during said time window.

4. The method according to claim 1, wherein the mapping is further responsive to previously transmitted symbols.

5. The method according to claim 1, operable according to at least one of the following:
   i. the mapping comprises imposing a Markovian symbol distribution at an output of the transmitter;
   ii. the mapping is set regardless of a maximization of entropy;
   iii. the mapping comprises calculating a set of one or more candidate symbols that when transmitted instead of said input symbol, maintain said peak power constraint at the input of the receiver;
   iv. the mapping is responsive to an impulse response of the communication channel and to the peak power constraint at the input of the receiver;
   v. wherein said input of the receiver being an input of analog to digital converter (ADC) of the receiver.

6. The method according to claim 1, wherein the mapping comprises:
   determining whether said transmission of the output symbol with a value that equals the input symbol will affect a deviation from the peak power constraint at the input of the receiver; and
   upon determining that said deviation will be affected by said transmission selecting said output symbol from a set of candidate symbols that maintain said peak power constraint at an input of an ADC of the receiver.

7. The method according to claim 6, wherein said selecting is such that, the output symbol being selected from the set of candidate symbols has a lowest Hamming distance from the input symbol.

8. The method according to claim 1, further comprising receiving, by the receiver, a received symbol that represents the output symbol; and de-mapping the received symbol, by a de-mapper of the receiver, to a de-mapped symbol that represents the input symbol.

9. The method according to claim 8, wherein the de-mapping comprises applying maximum a posteriori decoding process on the received symbol, wherein the branches probabilities of each state in a trellis are calculated on the fly.

10. The method according to claim 1, wherein the mapping comprises using a channel-state dependent mapping table comprising, for each channel state sk-1, quantized values of probabilities of the channel state to become a next channel state sk, given that the channel state is sk-1.

11. A method for Peak to Average Power Ratio (PAPR) reduction at an input of analog to digital converter (ADC) of a receiver, the method comprising:
   mapping, by a mapper, an input symbol to an output symbol that maintains a peak power constraint at the input of the ADC of the receiver; wherein the mapping is responsive to a state of a communication channel to said receiver following a transmission of a current output symbol;
   wherein upon determination that a transmission of the output symbol that equals the input symbol will cause to a deviation from the peak power constraint at the input of the ADC of the receiver, the mapping comprises selecting as the output symbol a selected candidate symbol out of a set of candidate symbols that when transmitted the peak power constraint at the input of the ADC of the receiver is satisfied.

12. A system, comprising:
   a transmitter that comprises: (i) a mapper that is configured to map an input symbol to an output symbol that maintains a peak power constraint at an input of an analog to digital converter (ADC) of a receiver; wherein the mapping is responsive to a state of a communication channel to said receiver following a transmission of a current output symbol; and (ii) a transmission circuit that is configured to transmit the output symbol.

13. The system of claim 12, comprising the receiver, wherein the receiver comprises:
   (i) an interface that is configured to receive a received symbol that represents the output symbol; and
   (ii) a de-mapper that is configured to de-map the received symbol, to a de-mapped symbol that represents the input symbol.

14. The system of claim 12, wherein the mapper is configured to carry out at least one of the following:
   determining said state of the communication channel following said transmission whereby said determining of said state comprises checking whether transmission of the output symbol of a certain value will affect a deviation from the peak power constraint at the input of the ADC of the receiver upon transmission of an additional output symbol of any value over the communication channel during a certain time window that follows the transmission of the output symbol; and
   setting said output symbol with a value that differs from said certain value upon determining that said state of the communication channel following said transmission of the output symbol of the certain value, will affect the deviation from the peak power constraint at the input of the ADC of the receiver upon transmission of the additional output symbol of any value over the communication channel during the certain time window that follows the transmission.

15. The system according to claim 12, wherein the mapping is further responsive to previously transmitted symbols.

16. At least one non-transitory computer readable medium that stores instructions for Peak to Average Power Ratio (PAPR) reduction at an input of an analog to digital converter (ADC) of a receiver of a system, wherein the instructions, once executed by the system, cause the system to carry out mapping, by a mapper of a transmitter of the system, of an input symbol to an output symbol that maintains a peak power constraint at the input of the ADC of the receiver; wherein the mapping is responsive to a state of a communication channel to said receiver following a transmission of a current output symbol; and transmitting the output symbol by the transmitter.

17. The at least one non-transitory computer readable medium according to claim 16, wherein one or more of the following:
   said mapping comprises imposing a Markovian symbol distribution at an output of the transmitter said mapping is set regardless of a maximization of entropy;

said mapping comprises calculating a set of one or more candidate symbols that when transmitted instead of said input symbol, maintain said peak power constraint at the input of the ADC of the receiver;

said mapping is responsive to a channel impulse response and to the peak power constraint at the input of the ADC of the receiver; and said mapping comprises using a channel-state dependent mapping table comprising, for each current channel state, quantized values of probabilities of a next channel state to become sk, given that a current state is sk-1.

18. The at least one non-transitory computer readable medium according to claim 16, wherein the mapping comprises:

determining whether the transmission of the output symbol that equals the input symbol will cause to a deviation from the peak power constraint at the input of the ADC of the receiver; and when determining that the deviation from the peak constraint, then selecting as the output symbol a selected candidate symbol out of a set of candidate symbols that when transmitted the peak power constraint at the input of the ADC of the receiver is satisfied.

19. The at least one non-transitory computer readable medium according to claim 18 that stores instructions for selecting the selected output symbol of the set, the selected output symbol of the set has a lowest Hamming distance from the input symbol, out of the set of candidate symbols.

20. The at least one non-transitory computer readable medium according to claim 16, wherein the mapping comprises at least one of the following:

determining said state of the communication channel following said transmission whereby said determining of said state comprises checking whether transmission of the output symbol of a certain value will affect a deviation from the peak power constraint at the input of the ADC of the receiver upon transmission of an additional output symbol of any value over the communication channel during a certain time window that follows the transmission of the output symbol; and setting said output symbol with a value that differs from said certain value upon determining that said state of the communication channel following said transmission of the output symbol of the certain value, will affect the deviation from the peak power constraint at the input of the ADC of the receiver upon the transmission of the additional output symbol of any value over the communication channel during the certain time window that follows the transmission.

21. The at least one non-transitory computer readable medium according to claim 16, wherein the instructions, once executed by the system, further cause the system to carry out:

receiving, by the receiver, a received symbol that represents the output symbol; and de-mapping the received symbol, by a de-mapper of the receiver, to a de-mapped symbol that represents the input symbol.

22. The at least one non-transitory computer readable medium according to claim 21, wherein the de-mapping comprises applying a maximum a posteriori decoding process on the received symbol, wherein the branches probabilities of each state in a trellis are calculated on the fly.

* * * * *